(12) United States Patent
Wariishi et al.

(10) Patent No.: US 6,406,817 B2
(45) Date of Patent: *Jun. 18, 2002

(54) CROSSLINKED POLYMER, ELECTROLYTE USING THE POLYMER, AND NONAQUEOUS SECONDARY BATTERY USING THE ELECTROLYTE

(75) Inventors: Koji Wariishi; Hideki Tomiyama; Yukio Maekawa, all of Kanagawa (JP)

(73) Assignee: Ube Industries, Ltd., Yamaguchi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/343,275

(22) Filed: Jun. 30, 1999

(30) Foreign Application Priority Data

Jul. 1, 1998 (JP) .......................................... 10-186274
Jul. 3, 1998 (JP) .......................................... 10-189027

(51) Int. Cl.⁷ ...................... H01M 10/40; C08F 228/02
(52) U.S. Cl. ........................ 429/314; 526/286; 526/310
(58) Field of Search ................... 429/314, 317; 521/38; 526/90, 286, 310, 336

(56) References Cited

U.S. PATENT DOCUMENTS

| | | | | |
|---|---|---|---|---|
| 2,768,991 A | * | 10/1956 | Schnell et al. | |
| 4,378,251 A | * | 3/1983 | Stavinoha et al. | ........ 526/90 X |
| 4,408,029 A | * | 10/1983 | Stavinoha et al. | ........ 526/90 X |
| 4,431,726 A | * | 2/1984 | Kojima et al. | .......... 526/286 X |
| 4,803,252 A | * | 2/1989 | Kida et al. | .............. 526/310 X |
| 5,240,586 A | * | 8/1993 | Moore et al. | ................ 204/418 |
| 5,262,253 A | * | 11/1993 | Golovin | |
| 5,279,910 A | * | 1/1994 | Sasaki et al. | ........... 429/317 X |
| 5,453,429 A | * | 9/1995 | Bliem et al. | ............. 526/310 X |
| 5,952,126 A | * | 9/1999 | Lee et al. | ................... 429/314 |
| 5,965,300 A | * | 10/1999 | Lee et al. | ................... 429/314 |

* cited by examiner

*Primary Examiner*—Stephen Kalafut
(74) *Attorney, Agent, or Firm*—Sughrue Mion, PLLC

(57) ABSTRACT

A crosslinked polymer with high ionic conductivity, an electrolyte using the crosslinked polymer and a process for producing the electrolyte, and a nonaqueous secondary battery using the electrolyte. Crosslinked polymers obtained by a crosslinking reaction between a compound having at least two substituents, in total, of at least one kind selected from the group consisting of $\alpha,\beta$-unsaturated sulfonyl, $\alpha,\beta$-unsaturated nitryl and $\alpha,\beta$-unsaturated carbonyl groups in its molecule and a compound having at least two nucleophilic groups in its molecule.

10 Claims, 1 Drawing Sheet

CROSSLINKED POLYMER, ELECTROLYTE USING THE POLYMER, AND NONAQUEOUS SECONDARY BATTERY USING THE ELECTROLYTE

FIELD OF THE INVENTION

This invention relates to curable polymers which are usable as materials for electrolytes to be used in electrochemical elements such as batteries, capacitors, sensors, display devices and recording devices and electrolytes using these polymers.

BACKGROUND OF THE INVENTION

It has been a practice to use liquids as electrolytes in electrochemical elements such as batteries, capacitors, sensors, display devices and recording devices. When used or stored over a long time, however, liquid electrolytes sometimes suffer from leakage, thus showing poor reliability.

In recent years, mobile personal computers and mobile phones have widely spread and thus it has been required to enlarge the capacity of secondary batteries. Thus, attempts have been widely made to develop lithium ion nonaqueous secondary batteries with enlarged capacity which are now mainly employed as small-size secondary batteries. However, it is unavoidable that batteries comprising low-molecular weight solvent (e.g., ethylene carbonate, propylene carbonate, diethyl carbonate, etc.) suffer from liquid-leakage.

On the other hand, researches and developments have been vigorously made on solid electrolytes in order to solidify electrolytes to thereby prevent liquid-leakage, thus giving highly reliable elements. At present, polyethylene oxide (hereinafter referred to simply as PEO), its derivatives and composites thereof with alkali metal salts are well known as organic solid electrolytes. However, PEO composites are frequently crystallized and thus fail to achieve high conductivity. To solve this problem, JP-A-63-76273 discloses a crosslinked polymeric solid electrolyte obtained by reacting a polyether having a hydroxyl group with a diacrylate (the term "JP-A" as used herein means an "unexamined published Japanese patent application"). However, this electrolyte is still insufficient in conductivity, i.e., about $10^{-4}$ S/cm at room temperature. Moreover, a secondary battery using this electrolyte is still insufficient in discharge capacity at low temperatures. In addition, it is required to use a strong base in the crosslinking reaction to synthesize the above-mentioned electrolyte. It is therefore desired to develop an electrolyte which can be obtained under mild reaction conditions.

SUMMARY OF THE INVENTION

An object of the present invention is to provide crosslinked polymers which are useful as electrolytic materials. Another object thereof is to provide electrolytes with high ion conductivity by using these crosslinked polymers. Further object thereof is to provide a process for producing electrolytes with high ion conductivity under mild conditions by using crosslinked polymers.

An still further object of the present invention is to provide secondary batteries by using solid electrolytes which have high ion conductivity and are easy to handle. Additional object thereof is to provide secondary batteries which are free from liquid-leakage and show excellent discharge properties at low temperatures.

The present inventors have conducted intensive studies and, as a result, developed the following crosslinked polymers, electrolytes using the crosslinked polymers and nonaqueous secondary batteries using the electrolytes, thus successfully achieving the above-mentioned objects of the present invention.

(1) A crosslinked polymer which is obtained by a crosslinking reaction between a compound having at least two substituents, in total, of at least one kind selected from the group consisting of α,β-unsaturated sulfonyl, α,β-unsaturated nitryl and α,β-unsaturated carbonyl groups in its molecule and a compound having at least two nucleophilic groups in its molecule.

(2) An electrolyte containing a crosslinked polymer, which is obtained by a crosslinking reaction between a compound having at least two substituents, in total, of at least one kind selected from the group consisting of α,β-unsaturated sulfonyl, α,β-unsaturated nitryl and α,β-unsaturated carbonyl groups in its molecule and a compound having at least two nucleophilic groups in its molecule, and a salt.

(3) A process for producing an electrolyte comprising reacting a compound having at least two substituents, in total, of at least one kind selected from the group consisting of α,β-unsaturated sulfonyl, α,β-unsaturated nitryl and α,β-unsaturated carbonyl groups in its molecule with a compound having at least two nucleophilic groups in its molecule in a salt or an organic solvent in which the salt is dissolved.

(4) A nonaqueous secondary battery having a positive electrode, a negative electrode and an electrolyte, wherein said electrolyte is one comprising a crosslinked polymer, which is obtained by a crosslinking reaction between a compound having at least two substituents, in total, of at least one kind selected from the the group consisting of α,β-unsaturated sulfonyl, α,β-unsaturated nitryl and α,β-unsaturated carbonyl groups in its molecule and a compound having at least two nucleophilic groups in its molecule, a an organic solvent.

Figure 1:
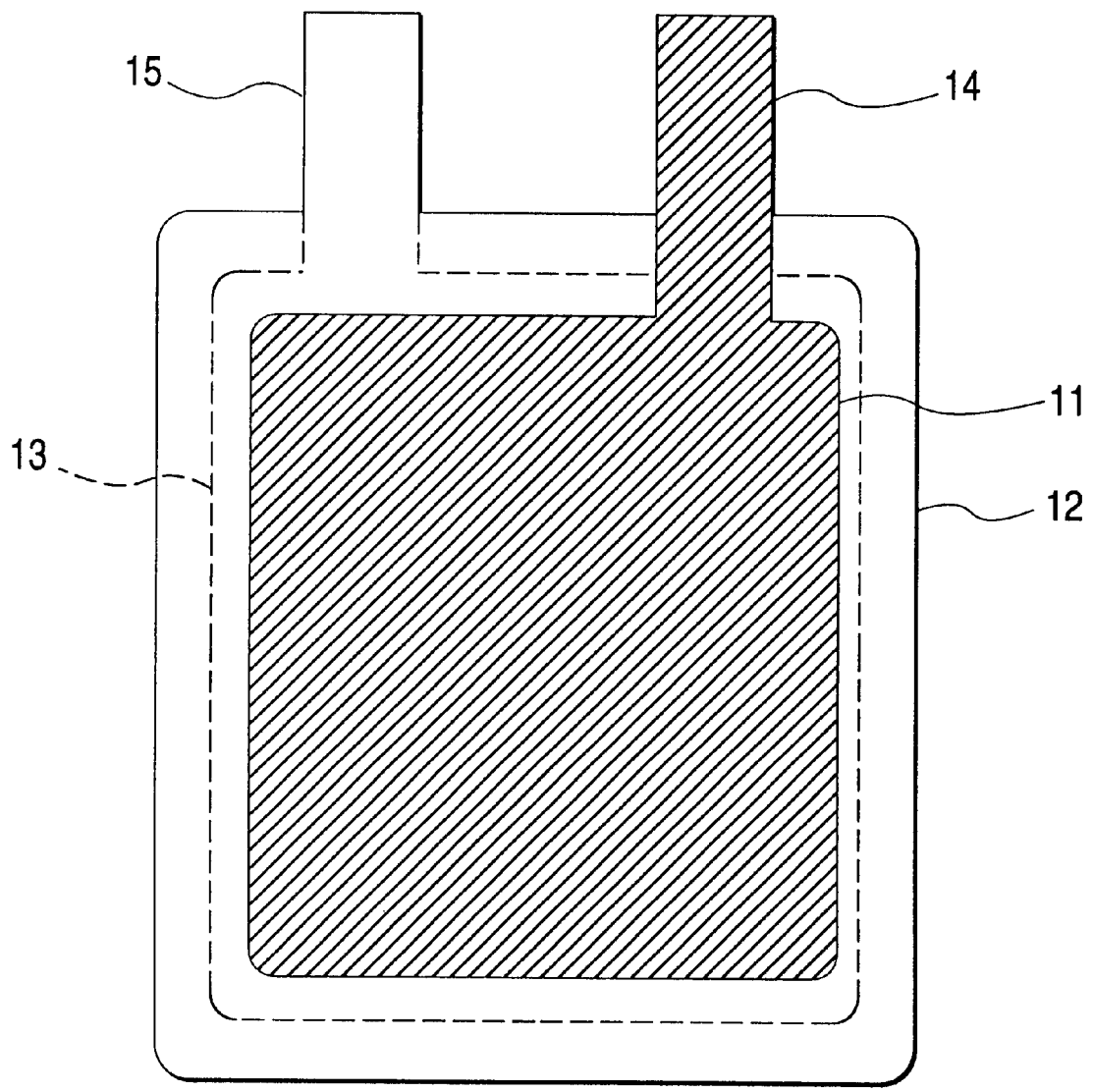
FIG. 1 is a schematic view of the sheet-type battery employed in Examples wherein each numerical symbol has the following meaning.

| | |
|---|---|
| 11 | positive electrode sheet; |
| 12 | polymeric solid electrolyte; |
| 13 | negative electrode sheet; |
| 14 | positive electrode terminal; and |
| 15 | negative electrode terminal. |

DETAILED DESCRIPTION OF THE INVENTION

Now the present invention will be described in greater detail.

The present invention is characterized by using a crosslinked polymer which can be easily obtained by a Michael reaction between a compound having two or more subtituents selected from the group consisting of α,β- unsaturated sulfonyl, α,β-unsaturated nitryl and α,β-unsaturated carbonyl groups and a compound having two or more nucleophilic groups.

It is preferable that the number of α,β-unsaturated sulfonyl α,β-unsaturated nitryl and/or α,β-unsaturated carbonyl groups in the compound having the groups is from 2 to 10 till preferably from 2 to 6, in its molecule. Such a compound may have different unsaturated groups in its molecule.

Now Examples of the compound having α,β-unsaturated sulfonyl, α,β-unsaturated nitryl and/or α,β-unsaturated carbonyl groups will be given, though the present invention is not restricted thereto.

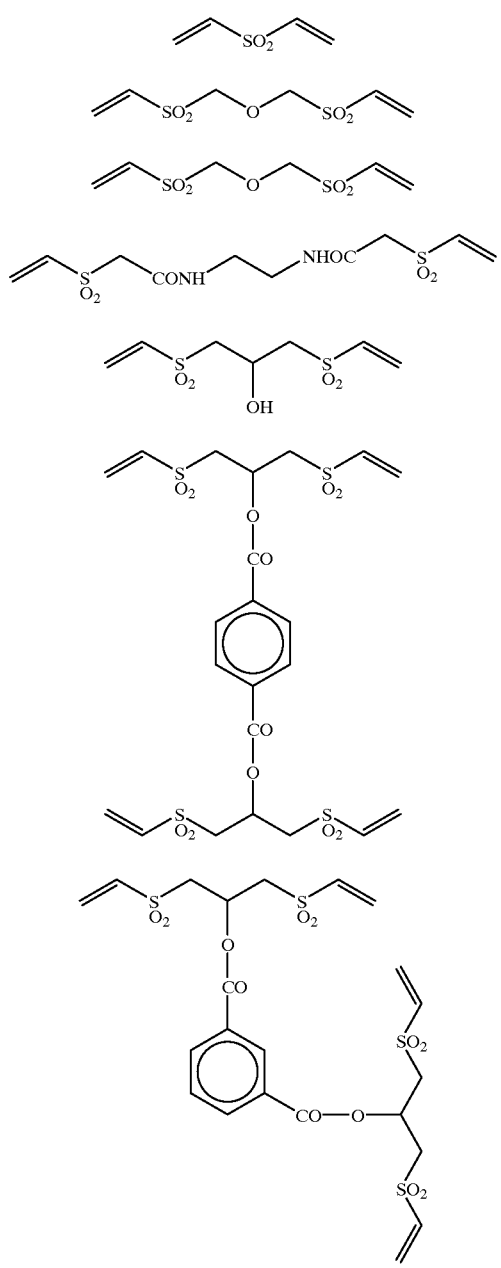
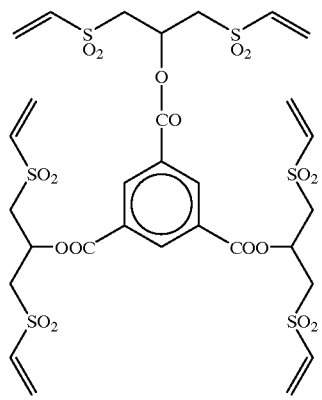
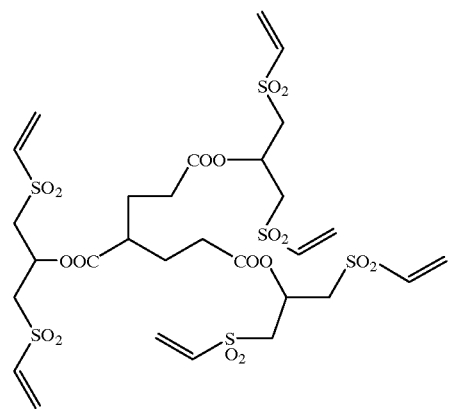
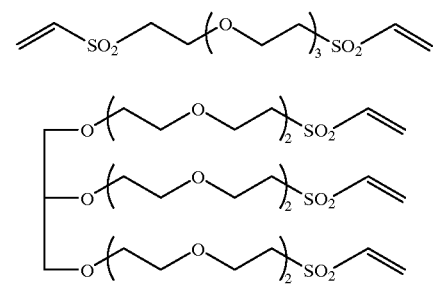
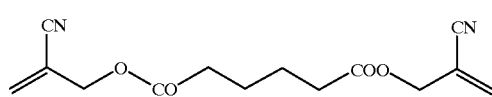

2-2
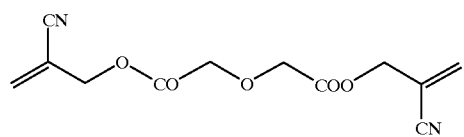

2-3
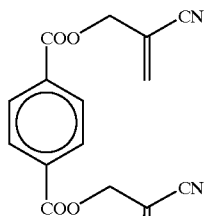

2-4
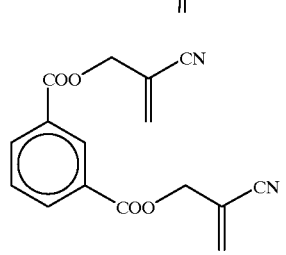

2-5
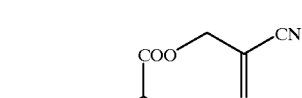

2-6
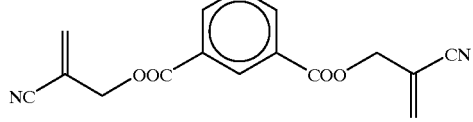

2-7
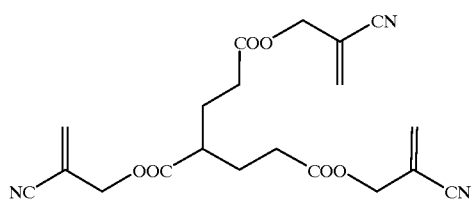

2-8
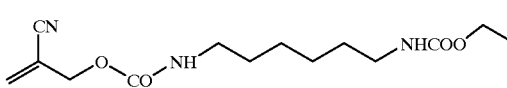

2-9
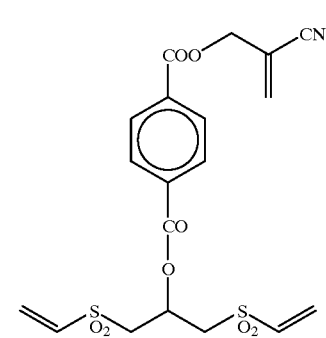

2-10
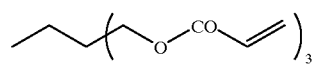

2-11
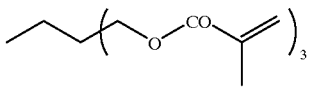

2-12
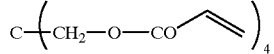

2-13
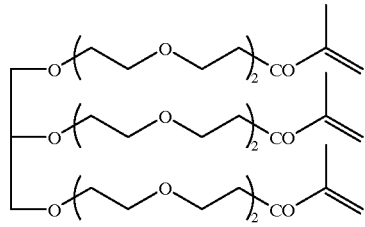

2-14
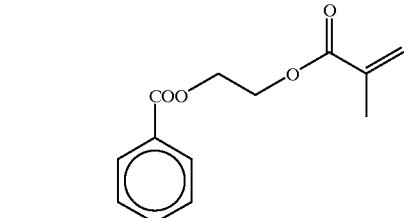

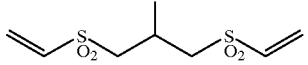

In the compound having two or more nucleophilic groups to be used in the present invention, each nucleophilic group means one which has an unshared electron pair or is negatively charged and capable of providing two bond electrons, when it attacks another molecule to form a bond. Preferable examples thereof include amino, mercapto, sulfido, sulfino and sulfinato groups. Among these, an amino group is particularly preferred.

It is preferable that the compound has from 2 to 10, still preferably from 2 to 6, nucleophilic groups.

It is preferable that the sum of the substituents in the compound having α,β-unsaturated sulfonyl, α,β-unsaturated nitryl and/or α,β-unsaturated carbonyl groups and the nucleophilic groups in the compound having two or more nucleophilic groups is from 5 to 12, still preferably from 5 to 10.

It is preferable that the compound having two or more nucleophilic groups further has a polyether bond in its molecule.

It is preferable that the ratio of the number (n) of the nucleophilic groups to the number of oxygen atoms (O) participating in the polyether bond (i.e., the oxygen atom number/nucleophilic group number ratio) is from 0 to 50, still preferably form 0.5 to 30.

Now, examples of the compound having two or more nucleophilic group will be given, though the present invention is not restricted thereto.

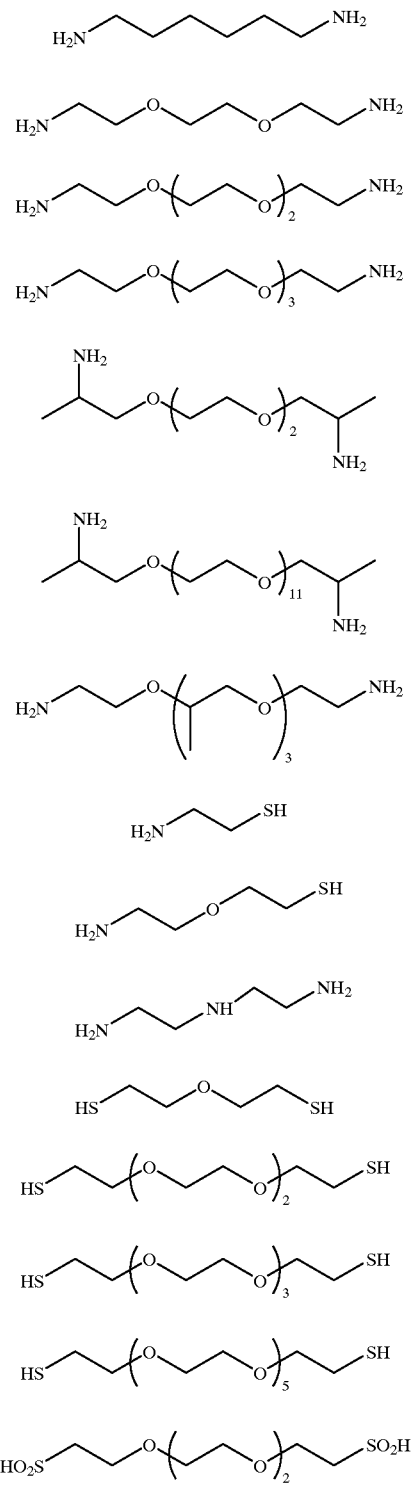

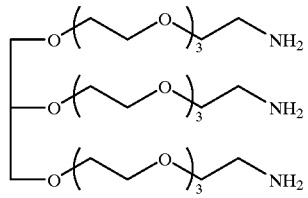

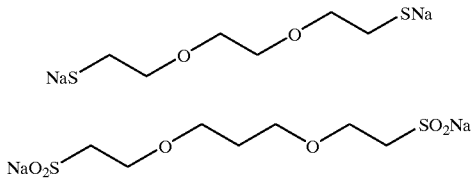

Typical examples of the organic solvent usable in the present invention are as follows.

Carbonic acid ester derivatives such as ethylene carbonate, propylene carbonate, vinylene carbonate, butylene carbonate, dimethyl carbonate, diethyl carbonate, methyl ethyl carbonate and dipropyl carbonate.

Lactone derivatives such as γ-butyrolactone, γ-valerolactone, γ-caprilolactone, crotolactone, γ-caprolactone and δ-valerolactone.

Ether derivatives such as ethyl ether, 1,2-dimethoxyethane, diethoxyethane, trimethoxymethane, ethylene glycol dimethyl ether and polyethylene glycol dimethyl ether.

Tetrahydrofuran derivatives such as tetrahydrofuran and 2-methyltetrahydrofuran.

Organic nitrile derivatives such as acetonitrile, glutarodinitrile, propionitrile, methoxyacetonitrile and benzonitrile.

Carboxylic acid ester derivatives such as methyl formate, methyl acetate, ethyl acetate and methyl propionate.

Phosphoric acid triester derivatives such as trimethyl phosphate and triethyl phosphate.

In addition to the above-mentioned ones, use may be made of aprotic organic solvents such as dimethyl sulfoxide, sulfolane, formamide, N,N-dimethylformamide, nitromethane, N-methylpyrrolidone, 1,3-dioxolane, 1,4-dioxane, 4-methyl-1,3-dioxane, 2-methyl-1,3-dioxolane, 3-methyl-2-oxazolidinone, propylene carbonate derivatives and 1,3-propanesultone.

Among these organic solvents, it is preferable to use carbonic acid esters or organic nitrile derivatives. Either one of these organic solvents or a mixture of two or more thereof may be used.

Examples of the salt to be used in the present invention include metal salts ($LiCF_3SO_3$, $LiPF_6$, $LiClO_4$, $LiI$, $LiBF_4$, $LiCF_3CO_2$, $LiSCN$, $LiN(SO_2CF_3)_2$, $NaI$, $NaBr$, $NaCF_3SO_3$, $NaClO_4$, $NaBF_4$, $NaAsF_6$, $KCF_3SO_3$, $KSCN$, $KPF_6$, $KClO_4$, $KAsF_6$, $KI$, $KBr$, $CsI$, $CsBr$, $CaI_2$, $CaBr_2$, metal iodides such as alkali metal iodides and alkaline earth metal iodide, and metal bromides such as alkali metal bromdies and alkaline earth metal bromides, etc.); nonmetallic salts such as iodine salts of quaternary ammonium compounds (e.g., tetraalkylammonium iodide, pyridinium iodide, etc.) and bromine salts of quaternary ammonium compounds (e.g., tetraalkylammonium bromide, pyridinium bromide, etc.); metal complex salts (e.g., ferrocyanate-ferricyanate, ferroceneferricyanium ion, etc.) and viologen dye. Either one of these salts or a mixture of two or more thereof may be employed. Among these, metal salts and nonmetallic salts are preferred. Particularly preferable examples of the salt include $LiPF_6$, $LiBF_4$ and $LiClO_4$.

The electrolyte with the use of the crosslinked polymer according to the present invention can be produced under mild conditions without use of any strong base, by adding, to an organic solvent containing a salt dissolved therein, a compound having at least two substituents, in total, of at least one kind selected from among $\alpha,\beta$-unsaturated sulfonyl, $\alpha,\beta$-unsaturated nitryl and $\alpha,\beta$-unsaturated carbonyl groups in its molecule and a compound having at least two nucleophilic groups in its molecule successively (in an arbitrary order). The reaction temperature preferably ranges from 0 to 150° C., still preferably from 10 to 100° C. The reaction is continued preferably for 5 minutes to 2 days, still preferably from 1 hour to 1 day. The reaction temperature and the reaction time may be arbitrarily selected so as to regulate the reaction, without restriction to those defined above.

It is preferable that the ratio of the compound having at least two substituents, in total, of at least one kind selected from the group consisting of $\alpha,\beta$-unsaturated sulfonyl, $\alpha,\beta$-unsaturated nitryl and $\alpha,\beta$-unsaturated carbonyl groups in its molecule to the compound having at least two nucleophilic groups in its molecule is regulated so as to give the ratio of the sum (m) of the $\alpha,\beta$-unsaturated sulfonyl, $\alpha,\beta$-unsaturated nitryl and $\alpha,\beta$-unsaturated carbonyl groups to the sum (nu) of the nucleophilic groups, i.e., nu/m of from 0.5 to 5, still preferably from 0.5 to 2 and particularly preferably form 0.5 to 1.

In the present invention, it is preferable that the compound having at least two substituents, in total, of at least one kind selected from the group consisting of $\alpha,\beta$-unsaturated sulfonyl, $\alpha,\beta$-unsaturated nitryl and $\alpha,\beta$-unsaturated carbonyl groups in its molecule and the compound having at least two nucleophilic groups in its molecule are employed in a total amount of from 1 to 80% by weight, still preferably form 2 to 70% by weight and particularly preferably from 5 to 50% by weight, based on the organic solvent.

The concentration of the salt to be used in the present invention preferably ranges form 0.1 to 3 mol, still preferably from 0.1 to 2 mol, per liter of the organic solvent, though the present invention is not restricted thereto.

The positive electrode (or negative electrode) to be used in the present invention can be formed by applying a positive electrode material mixture (or a negative electrode material mixture) onto a current collector followed by molding. The positive electrode material mixture (or negative electrode material mixture) may contain, in addition to a positive electrode-active material (or a negative electrode material), various additives such as electric conducting agents, binders, dispersants, fillers, ionic conducting agents, pressure increasing agents, etc. Although such an electrode may be in the shape of a disc or plate, it is preferably in the form of a flexible sheet.

Next, the materials to be used as electrode material mixture in the present invention will be described.

In the present invention, it is preferable to use a lithium-containing transition metal oxide as the positive electrode-active material. The lithium-containing transition metal oxide means an oxide containing as the main components at least one transition metal element selected from the group consisting of Ti, V, Cr, Mn, Fe, Co, Ni, Mo and W together with lithium and having a molar ratio of the lithium to the transition metal of from 0.3 to 2.2.

A more preferable example thereof is an oxide containing as the main components at least one transition metal element selected from the group consisting of V, Cr, Mn, Fe, Co and Ni together with lithium and having a molar ratio of the lithium to the transition metal of from 0.3 to 2.2. It may further contain Al, Ga, In, Ge, Sn, Pb, Sb, Bi, Si, P, B, etc. in an amount less than 30% by mol based on the main transition metal.

Still more preferable examples of the lithium-containing transition metal oxide include $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-a}O_2$, $Li_xMn_2O_4$, $Li_xMn_cCo_{2-c}O_4$, $Li_xMn_cNi_{2-c}O_4$, $Li_xMn_cV_{2-c}O_4$ and $LiMn_cFe_{2-c}O_4$ (wherein x=0.02–1.2, a=0.1–0.9, b=0.8–0.98, c=1.6–1.96 and z =2.01–2.3).

The most desirable examples of the lithium-containing transition metal oxide include $Li_xCoO_2$, $Li_xNiO_2$, $Li_xMnO_2$, $Li_xCo_aNi_{1-a}O_2$, $Li_xMn_2O_4$ and $Li_xCo_bV_{1-b}O_z$, (wherein x=0.02–1.2, a=0.1–0.9, b=0.9–0.98 and z=2.01–2.3). In these compounds, x means a value before starting of the charge/discharge and thus varies with the charge/discharge.

The positive electrode-active material to be used in the present invention can be synthesized by mixing a lithium compound with a transition metal compound and calcining or using a solution reaction. calcining methods are particularly favorable therefor.

The calcining methods are described in detail in JP-A-6-60,867 (paragraph 35), JP-A-7-14,579, etc. which are usable in the present invention. The positive electrode-active material thus obtained by calcining may be washed with water, an acidic aqueous solution, an alkaline aqueous solution or an organic solvent prior to using.

To intercalate lithium ion into a transition metal oxide, it is also possible to react metallic lithium, a lithium alloy or butyl lithium with the transition metal oxide.

The average grain size of the positive electrode-active material to be used in the present invention preferably ranges from 0.1 to 50 $\mu$m, though the present invention is not restricted thereto. It is preferable that grains of 0.5 to 30 $\mu$m in grain size occupy 95% by volume or more based on the total volume. It is still preferable that the grains of 3 $\mu$m or less in size occupy 18% or less, based on the total volume, and the grains of from 15 to 25 $\mu$m in grain size occupy less than 18% based on the total volume. The specific surface area of the positive electrode-active material determined by the BET method is preferably from 0.01 to 50 m$^2$/g, still preferably from 0.2 to 1 m$^2$/g. It is also preferable that when 5 g of the positive electrode-active material is dissolved in 100 ml of distilled water, the supernatant has a pH value of from 7 to 12.

When the positive electrode-active material to be used in the present invention is obtained by calcining, the calcining temperature is preferably from 500 to 1500° C., still preferably from 700 to 1200° C. and particularly preferably from 750 to 1000° C. The calcining is performed preferably for 4 to 30 hours, still preferably for 6 to 20 hours and particularly preferably for 6 to 15 hours.

The negative electrode material to be used in the present invention may be an arbitrary compound so long as it can intercalate and deintercalate lithium ions. Examples of such a negative electrode material include metallic lithium, lithium alloys, carbonaceous compounds (or materials), simple substances of metals or semi-metals, inorganic oxides, inorganic chalcogen compounds, metal complexes and organic polymer compounds. Either one of these materials or a combination thereof may be employed. Among these negative electrode materials, preferable ones include carbonaceous compounds (or materials), simple substances and oxides of metals or semi-metals and chalcogen.

One of the negative electrode materials to be used in the present invention is a carbonaceous material capable of intercalating and deintercalating lithium. The term "carbonaceous material" means a material substantially consisting of carbon. Examples thereof include petroleum pitch, natural graphite, artificial graphite such as vapor phase growing graphite, and carbonaceous materials obtained by calcining various synthetic resins such as PAN-based resins or furfuryl alcoholic resins. Further, use may be made therefor of various carbon fibers such as PAN-based carbon fibers, cellulose-based carbon fibers, pitch-based carbon fibers, vapor phase growing carbon fibers, dehydrated PVA-based carbon fibers, lignin carbon fibers, glassy carbon fibers and activated carbon fibers, mesophase microspheres, graphite whiskers, tabular graphites, etc.

These carbonaceous materials can be classified into hardly graphitized carbon materials and graphite-type carbon materials depending on the extent of graphitization. It is preferable that these carbonaceous materials have such lattice spacing, density and crystal size as described in JP-A-62-122066, JP-A-2-66856 and JP-A-3-245473.

It is not always necessary that the carbonaceous material is a single substance. Namely, use may be also made of, for example, a mixture of natural graphite with artificial graphite as disclosed in JP-A-5-290844 or graphite having a covering layer as disclosed in JP-A-6-84516.

The simple substances and oxides of metals or semi-metals and chalcogen compounds (i.e., chalcogenides), i.e., another negative electrode material to be used in the present invention, are compounds consisting of elements of the group 13, 14 and 15 in the periodic table with oxygen atoms or chalcogen atoms.

In the present invention, it is particularly preferable to use as the negative electrode material a predominantly amorphous chalcogen compound or a predominantly amorphous oxide containing at least three kinds of atoms selected from the group consisting of elements of the group 1, 2, 13, 14 and 15 in the periodic table. The term "predominantly amorphous" as used herein means a substance has a broad scattering band having a peak of 20° to 40° in terms of a 2θ value in X-ray diffractometry using CuKα-ray. It may have crystalline diffraction line(s). It is preferable that the highest intensity of the crystalline diffraction lines observed at 40° to 70° in terms of a 2θ value is not more than 500 times, still preferably not more than 100 times and particularly preferably not more than 5 times, as high as the diffraction line intensity at the peak of the broad scattering band of 20° to 40° in terms of a 2θ value. In the most desirable case, the compound shows no crystalline diffraction line.

Preferable examples of the above-mentioned simple substances, chalcogen compounds (i.e., chalcogenides) and oxides include simple substances, composite chalcogen compounds (i.e., composite chalcogenides) and composite oxides containing, as the main component, at least one element selected from the group consisting of B, Al, Ga, In, Ti, Si, Ge, Sn, Pb, P, As, Sb and Bi. Still preferable examples thereof include composite chalcogen compounds or oxides containing, as the main component, at least two elements selected from the group consisting of B, Al, Si, Ge, Sn and P. These composite chalcogen compounds and composite oxides further contain at least one element selected from the group 1 and 2 elements in the periodic table mainly to modify the amorphous structure thereof.

Among the negative electrode materials as described above, amorphous composite oxides containing Sn as the main component represented by the following formula (3) are preferable.

$$SnM^3_c M^4_d O_t \qquad (3)$$

In the above formula, $M^3$ represents at least one element selected from the group consisting of Al, B, P, Si and Ge; $M^4$ represents at least one element selected from the group consisting of elements of the group 1 and 2 in the periodic table; c is from 0.2 to 2 and d is 0.01 to 1, provided that $0.2 < c+d < 2$; and t is from 1 to 6.

The amorphous composite oxide to be used in the present invention may be produced either by the calcining method or the solution method, though the calcining method is preferred. In the calcining method, it is preferable that oxides or compounds of the elements represented by formula (1) are mixed well and then calcined to give the aimed amorphous composite oxide.

The calcining is carried out at a rate of temperature rise of 5 to 200° C./min, at a calcining temperature of 500 to 1500° C./min. Also, it is preferable that the calcining is continued for 1 to 100 hours. After calcination, the system is cooled at a rate of temperature drop of from 2 to $10^{7°}$ C./min.

The term "rate of temperature-rise" as used herein means the average rate of temperature rise of from "50% of the calcining temperature (°C.)" to "80% of the calcining temperature (° C.)", and the term "rate of temperature-drop" as used herein means the average rate of temperature drop of from "80% of the calcining temperature (°C.)" to "50% of the calcining temperature (°C.)".

To lower temperature, the calcined product may be cooled in a calcining furnace. Alternatively, it may be cooled by taking out from the furnance and pouring into, for example, water. It is also possible to use therefor a super-quenching method (for example, gun method, Hammer-Anvil method, slap method, gas atomize method, plasma spray method, centrifugal quenching method or melt drag method described in "Ceramics Processing" (p. 217, Gihodo Shuppan, 1987). Moreover, use may be made therefor of the single roller method or the double roller method described in "New Glass Handbook", p. 172, (Maruzen, 1991). In the case of a material which is molten during calcining, the calcined product may be continuously taken out while supplying the raw materials in the course of calcining. In such a case, it is preferable to stir the molten liquor.

The calcining gas atmosphere preferably contains 5% by volume or less of oxygen. It is still preferable to use an atmosphere containing an inert gas as the main component together with a gas for regulating the partial oxygen pressure.

Examples of the inert gas include nitrogen, argon, helium, krypton and xenon. The most desirable inert gas is pure argon or nitrogen gas.

As the gas to be used together with the inert gas so as to regulate the partial oxygen pressure, it is preferable to employ a mixture of carbon dioxide gas with carbon monoxide or a mixture of hydrogen with vapor (i.e., water).

The average grain size of the compound to be used in the present invention preferably ranges from 0.1 to 60 μm. More particularly, it is preferable that the compound has an average grain size of from 0.7 to 25 μm and contains grains of 0.5 to 30 μm in size in an amount of 60% or more based on the total volume. Also, it is preferable that the negative electrode-active material to be used in the present invention contains 30% or less, based on the total volume, of grains of 1 μm or less in size and 25% or less, based on the total volume, of those of 20 μm or more in size. It is needless to say that the grain size of the material to be employed should not exceed the thickness of the electrode material mixture at one side of the negative electrode.

To achieve the definite grain size, well known grinders or classifiers are usable. For example, use may be made of a mortar, a ball mill, a sand mill, a vibrating ball mill, a satellite ball mill, a planetary ball mill, a spinning air flow type jet mill, a sieve, etc. It is also possible to perform grinding (i.e., wet grinding) in the coexistence of water or an organic solvent such as methanol. To achieve the desired grain size, it is preferable to carry out classification. The classification may be effected by an arbitrary method without restriction. Namely, use may be made of a sieve, a wind power classifier, etc., if necessary. Either dry classification or wet classification are usable in the present invention.

The term "average grain size" as used herein means the median size of primary grains. It can be measured by laser diffraction device for measuring grain size distribution.

It is preferable that the negative electrode material to be used in the present invention has a specific surface area measured by the BET method of from 0.1 to 5 $m^2/g$.

Next, examples of the negative electrode material usable in the present invention will be given, though the present invention is not restricted thereto.
$SnAl_{0.4}B_{0.5}P_{0.5}K_{0.1}O_{3.65}$, $SnA_{0.4}B_{0.5}P_{0.5}Na_{0.2}O_{3.7}$,
$SnAl_{0.4}B_{0.3}P_{0.5}Rb_{0.2}O_{3.4}$, $SnAl_{0.4}B_{0.5}P_{0.5}Cs_{0.1}O_{3.65}$,
$SnAl_{0.4}B_{0.5}P_{0.5}K_{0.1}Ge_{0.05}O_{3.85}$,
$SnAl_{0.4}B_{0.5}P_{0.5}K_{0.1}Mg_{0.1}Ge_{0.02}O_{3.83}$,
$SnAl_{0.4}B_{0.4}P_{0.4}O_{3.2}$, $SnAl_{0.3}B_{0.5}P_{0.2}O_{2.7}$,
$SnAl_{0.4}B_{0.5}P_{0.3}Ba_{0.08}Mg_{0.08}O_{3.26}$,
$SnA_{0.4}B_{0.4}P_{0.4}Ba_{0.08}O_{3.28}$, $SnAl_{0.4}B_{0.5}P_{0.5}O_{3.6}$,
$SnAl_{0.4}B_{0.5}P_{0.5}Mg_{0.1}O_{3.7}$,
$SnAl_{0.5}B_{0.4}P_{0.5}Mg_{0.1}F_{0.2}O_{3.65}$,
$SnB_{0.5}P_{0.5}Li_{0.1}Mg_0F_{0.2}O_{3.05}$,
$SnB_{0.5}P_{0.5}K_{0.1}Mg_{0.1}F_{0.2}O_{3.05}$,
$SnB_{0.5}P_{0.5}K_{0.05}Mg_{0.05}F_{0.1}O_{3.0}$,
$SnB_{0.5}P_{0.5}K_{0.5}Mg_{0.1}F_{0.2}O_{0.03}$,
$SnAl_{0.4}B_{0.5}P_{0.5}Cs_{0.1}Mg_{0.1}F_{0.2}O_{3.65}$,
$SnB_{0.5}P_{0.5}Cs_{0.05}Mg_{0.05}F_{0.1}O_{3.03}$, $SnB_{0.5}P_{0.5}Mg_{0.1}F_{0.1}O_{3.05}$,
$SnB_{0.5}P_{0.5}Mg_{0.1}F_{0.2}O_3$, $SnB_{0.5}P_{0.5}Mg_{0.1}F_{0.06}O_{3.07}$,
$SnB_{0.5}P_{0.5}Mg_{0.1}F_{0.14}O_{3.03}$,
$SnPBa_{0.08}O_{3.58}SnPK_{0.1}O_{3.55}$, $SnPK_{0.05}Mg_{0.05}O_{3.58}$,
$SnPCs_{0.1}O_{3.55}$,
$SnPBa_{0.08}F_{0.08}O_{3.54}$, $SnPK_{0.1}Mg_{0.1}F_{0.2}O_{3.55}$,
$SnPK_{0.05}Mg_{0.05}F_{0.1}O_{3.53}$,
$SnPCs_{0.1}Mg_{0.1}F_{0.2}O_{3.55}$, $SnPCs_{0.05}Mg_{0.05}F_{0.1}O_{3.53}$,
$Sn_{1.1}Al_{0.4}B_{0.2}P_{0.6}Ba_{0.08}F_{0.08}O_{3.54}$,
$Sn_{1.1}Al_{0.4}B_{0.2}P_{0.6}Li_{0.1}K_{0.1}Ba_{0.1}F_{0.1}O_{3.65}$,
$Sn_{1.1}Al_{0.4}P_{0.4}Ba_{0.08}O_{3.34}$, $Sn_{1.1}Al_{0.4}PCs_{0.05}O_{4.23}$,
$Sn_{1.1}Al_{0.4}PK_{0.05}O_{4.23}$,
$Sn_{1.2}Al_{0.5}B_{0.3}P_{0.4}Cs_{0.2}O_{3.5}$, $Sn_{1.2}Al_{0.4}B_{0.2}P_{0.6}Ba_{0.08}O_{3.68}$,
$Sn_{1.2}Al_{0.4}B_{0.2}P_{0.6}Ba_{0.08}Fe_{0.08}O_{3.64}$,
$Sn_{1.2}Al_{0.4}B_{0.2}P_{0.6}Mg_{0.04}Ba_{0.04}O_{3.68}$,
$Sn_{1.2}Al_{0.4}B_{0.3}P_{0.5}Ba_{0.08}O_{3.58}$, $Sn_{1.3}Al_{0.3}B_{0.3}P_{0.4}Na_{0.2}O_{3.3}$,
$Sn_{1.3}Al_{0.2}B_{0.4}P_{0.4}Ca_{0.2}O_{3.4}$, $Sn_{1.3}Al_{0.4}B_{0.4}P_{0.4}Ba_{0.2}O_{3.6}$,
$Sn_{1.4}Al_{0.4}PK_{0.2}O_{4.6}$,
$Sn_{1.4}Al_{0.2}Ba_{0.1}PK_{0.2}O_{4.45}$, $Sn_{1.4}Al_{0.2}Ba_{0.2}PK_{0.2}O_{4.6}$,
$Sn_{1.4}Al_{0.4}Ba_{0.2}PK_{0.2}Ba_{0.1}F_{0.2}O_{4.9}$, $Sn_{1.4}Al_{0.4}PK_{0.3}O_{4.65}$,
$Sn_{1.5}Al_{0.2}PK_{0.2}O_{4.4}$,
$Sn_{0.5}Al_{0.4}PK_{0.1}O_{4.65}Sn_{1.5}Al_{0.4}PCs_{0.05}O_{4.631}Sn_{1.5}Al_{0.4}PCs_{0.05}Mg_{0.1}F_{0.2}O_{4.63}$,
$SnSi_{0.4}Al_{0.1}B_{0.2}P_{0.1}Ca_{0.4}O_{3.1}$, $SnSi_{0.4}Al_{0.2}B_{0.4}O_{2.7}$,
$SnSi_{0.5}Al_{0.2}B_{0.1}P_{0.1}Mg_{0.1}O_{2.8}$, $SnSi_{0.6}Al_{0.2}B_{0.2}O_{2.8}$,
$SnSi_{0.5}Al_{0.3}B_{0.4}P_{0.2}O_{3.55}$,
$SnSi_{0.5}Al_{0.3}B_{0.4}P_{0.5}O_{4.30}$, $SnSi_{0.6}Al_{0.1}B_{0.1}P_{0.3}O_{3.25}$,
$SnSi_{0.6}Al_{0.1}B_{0.1}P_{0.1}Ba_{0.2}O_{2.95}$,
$SnSi_{0.6}Al_{0.1}B_{0.1}P_{0.1}Ca_{0.2}O_{2.95}$,
$SnSi_{0.6}Al_{0.4}B_{0.2}Mg_{0.1}O_{3.2}$, $SnSi_{0.6}Al_{0.1}B_{0.3}P_{0.1}O_{3.05}$,
$SnSi_{0.6}Al_{0.2}Mg_{0.2}O_{2.7}$,
$SnSi_{0.6}Al_{0.2}Ca_{0.2}O_{2.7}$, $SnSi_{0.6}Al_{0.2}P_{0.2}O_3$,
$SnSi_{0.6}B_{0.2}P_{0.2}O_3$,
$SnSi_{0.8}Al_{0.2}O_{2.9}$, $SnSi_{0.8}Al_{0.3}B_{0.2}P_{0.2}O_{3.85}$, $SnSi_{0.8}B_{0.2}O_{2.9}$,
$SnSi_{0.8}Ba_{0.2}O_{2.8}$, $SnSi_{0.8}Mg_{0.2}O_{2.8}$, $SnSi_{0.8}Ca_{0.2}O_{2.8}$,
$SnSi_{0.8}P_{0.2}O_{3.1}$,
$Sn_{0.9}Mn_{0.3}B_{0.4}P_{0.4}Ca_{0.1}Rb_{0.1}O_{2.95}$,
$Sn_{0.9}Fe_{0.3}B_{0.4}P_{0.4}Ca_{0.1}Rb_{0.1}O_{2.95}$,
$Sn_{0.8}Pb_{0.2}Ca_{0.1}P_{0.9}O_{3.35}$, $Sn_{0.3}Ge_{0.7}Ba_{0.1}P_{0.9}O_{3.35}$,
$Sn_{0.9}Mn_{0.1}Mg_{0.1}P_{0.9}O_{3.35}$,
$Sn_{0.2}Mn_{0.8}Mg_{0.1}P_{0.9}O_{3.35}$, $Sn_{0.7}Pb_{0.3}Ca_{0.1}P_{0.9}O_{3.35}$,
$Sn_{0.2}Ge_{0.8}Ba_{0.1}P_{0.9}O_{3.35}$,
$SnSi_{0.8}B_{0.2}O_{2.9}$, $SnSi_{0.7}B_{0.3}O_{2.85}$, $SnSi_{0.7}B_{0.3}Al_{0.1}O_{3.0}$,
$SnSi_{0.5}B_{0.3}Al_{0.1}Mg_{0.1}O_{2.7}$, $Sn_{0.8}Si_{0.6}B_{0.2}Al_{0.1}Li_{0.1}O_{2.5}$,
$Sn_{0.8}Si_{0.6}B_{0.2}Al_{0.1}Cs_{0.1}O_{2.65}$, $Sn_{0.8}Si_{0.7}B_{0.1}P_{0.1}Al_{0.1}O_{2.75}$,
$Sn_{0.8}Si_{0.5}B_{0.3}P_{0.2}Al_{0.1}O_{2.9}$,
$Sn_{0.8}Si_{0.7}B_{0.1}P_{0.1}Al_{0.1}Li_{0.05}O_{2.78}$,
$Sn_{0.8}Si_{0.5}B_{0.3}P_{0.1}Al_{0.1}Li_{0.1}O_{2.7}$,
$Sn_{0.8}Si_{0.5}B_{0.3}P_{0.2}Al_{0.1}Cs_{0.1}O_{2.95}$,
$Sn_{0.8}Si_{0.7}P_{0.3}O_{2.95}$, $Sn_{0.8}Si_{0.7}P_{0.3}Al_{0.1}O_{3.1}$,
$SnSi_{0.5}B_{0.3}Zr_{0.1}O_{2.65}$,
$Sn_{0.8}Si_{0.6}P_{0.2}Zr_{0.1}O_{2.7}$ and $Sn_{0.8}Si_{0.6}B_{0.2}P_{0.1}Zr_{0.1}O_{2.75}$.

The chemical formulae of the above compounds obtained by calcining can be measured by the inductive coupling plasma (ICP) emission spectroscopy or conveniently calculated by the difference of the powder weights before and after calcining.

As the negative electrode material in the present invention, a light metal, in particular, lithium can be intercalated. Lithium may be intercalated, for example, electrochemically, chemically or thermally. It is particularly preferable to use an electrochemical method therefor. For example, a small metal piece mainly comprising lithium is adhered to an uncoated part of a negative electrode material mixture or a negative electrode material mixture layer on a current collector and brought into contact with an electrolytic solution, thus intercalating lithium. It is still preferable to employ a method in which lithium is electrochemically intercalated within the battery. As the small metal piece mainly comprising lithium, it is favorable to use a rectangular piece of a foil having a thickness of 5 to 200 μm.

When lithium is employed as the counter electrode, lithium may be intercalated up to 0.01 V, still preferably up to 0.05 V. A particularly preferable method therefor comprises partly intercalating lithium so as to compensate for the irreversible capacity of the negative electrode material, thus intercalating up to 0.3 V when lithium is employed as the counter electrode.

More particularly, it is preferable to intercalate lithium in an amount of from 0.005 to 0.5 g, still preferably from 0.03 to 0.2 g and particularly preferably from 0.06 to 0.15 g, per gram of the negative electrode material. When a metal oxide is used as the negative electrode material, it is preferable to intercalate lithium in an amount of from 0.5 to 4.0 equivalents, still preferably from 1 to 3.5 equivalents and particularly preferably from 1.2 to 3.2 equivalents, per mol of the metal oxide. When less than 1.2 equivalents of lithium is preliminarily intercalated into the negative electrode material, only a low battery capacity is obtained. When more than 3.2 equivalents of lithium is preliminarily intercalated thereinto, on the other hand, the cycle characteristic is deteriorated. Both of these cases are unfavorable.

The amount of the lithium to be intercalated can be arbitrarily adjusted by controlling the amount of the lithium laminated on the negative electrode sheet. As the metal mainly comprising lithium, it is preferable to use metallic lithium preferably having a purity of 90% by weight or above, still preferably 98% by weight or above. To laminate lithium on the negative electrode sheet, it is preferable to laminate the lithium foil on the whole surface of the negative electrode sheet. Also, since the lithium preliminarily intercalated into the negative electrode material would gradually diffuse within the negative electrode material as aging proceeds, it is also preferable to laminate the lithium foil not totally but partly on the sheet to give stripes, frames or a disc. The term "laminate" as used herein means that the metal foil mainly comprising lithium is pressed directly onto a sheet having the negative electrode material mixture and an auxiliary layer.

The covering ratio of the metal foil laminated on the negative electrode sheet preferably ranges from 10 to 100%, still preferably from 15 to 100% and particularly preferably from 20 to 100%. It is not preferable that the covering ratio is less than 20%, since the lithium can not be uniformly intercalated sometimes in such a case. From the viewpoint of uniformity, it is preferable that the metal foil mainly comprising lithium has a thickness of from 5 to 150 $\mu$m, still preferably from 5 to 100 $\mu$m and particularly preferably from 10 to 75 $\mu$m.

The metal foil mainly comprising lithium is handled (i.e., cut, adhered, etc.) in a dry air or argon atmosphere at a temperature of from −80 to −30° C. When a dry air atmosphere is employed, it is still preferable to handle the foil at a temperature of from −80 to −40° C. It is also possible to further employ carbon dioxide gas in handling. When an argon gas atmosphere is employed, it is particularly preferable to use carbon dioxide gas therewith.

The conducting agent to be used in the present invention may be an arbitrary electric conducting material which does not undergo any chemical change in the thus constituted battery. Particular examples thereof include graphites such as natural graphites (for example, scaly graphite, flake graphite, earthy graphite), artificial graphites (for example, high-temperature calcined products of petroleum cokes, coal cokes, celluloses, saccharides, and mesophase pitch and vapor phase growing graphite); carbon blacks (for example, acetylene black, furnace black, Kejen black, channel black, lamp black, thermal black); carbon materials (for example, asphalt pitch, coal tar, activated carbon, mesophase pitch, polyacetan), electrically conductive fibers such as metal fibers; metal powders (for example, copper, nickel, aluminum, silver); electrically conductive whiskers (for example, zinc oxide, potassium titanate) and electrically conductive metal oxides (for example, titanium oxide). In the case of graphite, it is preferable to use one which is in the form of plates and has an aspect ratio of 5 or above. Among these conducting agents, it is preferable to use graphite or carbon black. The grain size thereof preferably ranges from 0.01 to 20 $\mu$m, still preferably from 0.02 to 10 $\mu$m. Either one of these conducting agents or a combination of two or more thereof may be employed. In the case of combined use, it is preferred to use a carbon black (for example, acetylene black) together with graphite of 1 to 15 $\mu$m in grain size.

It is preferable that the conducting agent is added to the electrode material mixture layer in an amount of from 1 to 50% by weight, still preferably from 2 to 30% by weight, based on the negative electrode material or the positive electrode material. In the case of carbon black or graphite, an addition level of 3 to 20% by weight is particularly preferable.

In the present invention, a binder is used to sustain an electrode material mixture. Examples of the binder include polysaccharides, thermoplastic resins and polymers with rubber elasticity. Preferable examples of the binder include emulsions (latexes) or suspensions of water-soluble polymers such as starch, carboxymethylcellulose, cellulose, diacetyl cellulose, methyl cellulose, hydroxyethyl cellulose, hydroxypropyl cellulose, sodium alginate, polyacrylic acid, sodium polyacrylate, polyvinylphenol, polyvinyl methyl ether, polyvinyl alcohol, polyvinyl pyrrolidone, polyacrylamide, polyhydroxy(meth)acrylate and styrene/maleic acid copolymer, polyvinyl chloride, polytetrafluoroethylene, polyvinylidene fluoride, tetrafluoroethylene/hexafluoropropylene copolymer, vinylidene fluoride/tetrafluoroethylene/hexafluoropropylene copolymer, polyethylene, polypropylene, ethylene/propylene/diene terpolymer (EPDM), sulfonated EPDM, polyvinylacetal resin, (meth)acrylate copolymers having (meth)acrylate such as methyl methacrylte and 2-ethylhexyl acrylate, (meth)acrylate/acrylonitrile copolymer, polyvinyl ester copolymers having vinyl ester such as vinyl acetate, styrene/butadiene copolymer, acrylonitrile/butadiene copolymer, polybutadiene neoprene rubber, fluororubber, polyethylene oxide, polyester polyurethane resin, polyether polyurethane resin, polycarbonate polyurethane resin, polyester resin, phenol resin and epoxy resin. Particular examples thereof include polyacrylate-based latex, carboxymethylcellulose, polytetrafluoroethylene and polyvinylidene fluoride. As the binder, it is preferable to use one prepared by dispersing a fine powder in water. The average grain size in the dispersion preferably ranges from 0.01 to 5 $\mu$m, still preferably from 0.05 to 1 $\mu$m.

Either one of these binders or a mixture thereof may be used. When the binder is added in an excessively small amount, only insufficient holding power and cohesive force are achieved on the electrode material mixture. When it is used in an excessively large amount, on the other hand, the electrode volume is enlarged and, in its turn, the capacity per unit electrode volume or unit weight is reduced. By taking these factors into consideration, it is preferred that the binder is added in an amount of from 1 to 30% by weight, still preferably from 2 to 10% by weight.

As the filler, an arbitrary one may be used so long as it is a fibrous material which undergoes no chemical change in the thus constructed battery. In usual, use is made therefor of olefin polymers such as polypropylene or polyethylene or fibers such as glass fiber or carbon fiber. It is preferable to add the filler in an amount of from 0 to 30% by weight, though the present invention is not restricted thereto.

As the ionic conductive agent, use can be made of those which have been known as inorganic or organic solid electrolytes, as described in detail with respect to the electrolytic solution.

A pressure-increasing agent means a compound capable of elevating the internal pressure of the battery. Typical examples thereof are carbonates such as lithium carbonate.

Regarding the current collectors usable in the present invention, the positive electrode may be made of aluminum, stainless steel, nickel, titanium or alloys thereof, while the negative electrode may be made of copper, stainless steel, nickel, titanium or alloys thereof. The current collector is in the form of a foil, an expanded metal, a punched metal or a wire gauze. In particular, it is preferable to use an aluminum foil for the positive electrode and a copper foil for the negative electrode.

The thickness of the foil preferably ranges from 5 to 100 $\mu$m, still preferably from 6 to 50 $\mu$m and particularly preferably from 7 to 20 $\mu$m.

It is preferable that the expanded metal, punched metal or wire gauze mesh has a thickness of from 5 to 200 $\mu$m, still preferably from 6 to 150 $\mu$m and particularly preferably from 7 to 100 $\mu$m. The fibrous substance constituting the expanded metal, punched metal or wire gauze has a diameter of from 0.1 to 200 $\mu$m, still preferably from 1 to 100 $\mu$m and particularly preferably from 5 to 50 $\mu$m.

It is preferable that the current collector has a purity of 98% or above, still preferably 99% or above and particularly preferably 99.3% or above. The surface of the current collector may be washed with an acid, an alkali, an organic solvent, etc.

To reduce the thickness, it is preferred that the current collector comprises a plastic sheet having metal layers formed on both surface sides thereof. As the plastic, it is preferable to use one which is excellent in stretchability and heat resistance, for example, polyethylene terephthalate. When the current collector is made of a metal alone, it is little elastic and thus poor in durability against external force. By forming metal layers on the plastic, the impact strength is elevated. More particularly speaking, the current collector may be a composite one wherein a substrate made of a synthetic resin film or paper is covered with an electron-conductive substance. Example of the synthetic resin film usable as the substrate include fluoroplastics, polyethylene terephthalate, polycarbonate, polyvinyl chloride, polystyrene, polyethylene, polypropylene, polyimide, polyamide, cellulose derivatives and polysulfone. On the other hand, examples of the electron-conductive substance usable in covering the substrate include carbonaceous materials (for example, graphite, carbon black), metal elements (for example, aluminum, copper, nickel, chromium, iron, molybdenum, gold, silver), and alloys thereof. Particularly preferable examples of the electron-conductive substance are metals, i.e., aluminum, copper, nickel and stainless steel. The composite collector may be formed by laminating the metal sheets on the substrate sheet or by forming the metal layers by, for example, vapor deposition.

Next, the constitutions of the positive electrode and the negative electrode to be used in the present invention will be described. It is preferable that the positive electrode and the negative electrode each comprises a current collector and an electrolyte material mixture applied onto both surface sides thereof. In this case, either one or two or more layers may be formed on each surface side. When two or more layers are formed on each surface side, two or more layers containing a positive electrode-active material (or a negative electrode material) may be formed. A still preferable construction comprises layer(s) containing a positive electrode-active material (or a negative electrode material) and layers free from the same. Examples of the layers containing no positive electrode-active material (or negative electrode material) include a protective layer for protecting the positive electrode-active material (or negative electrode material)-containing layers, an intermediate layer located between the positive electrode-active material (or a negative electrode material)-containing layers having been separated, and an undercoating layer located between the positive electrode-active material (or a negative electrode material)-containing layers and the current collector. In the present invention, these layers are called "auxiliary" layers in general.

It is preferable that the protective layer is formed in both or either of the positive electrode and the negative electrode. When lithium is to be intercalated into the negative electrode material in the negative electrode of the battery, it is preferable that the negative electrode has the protective layer. The protective layer comprises at least one layer. It may comprise two or more layers which are either the same or different from each other. It is also possible that one side of the electrode material mixture layers on both surface sides of the current collector has a protective layer. These protective layers are made of water-insoluble grains with a binder, etc.

As the binder, use can be made of those described above as examples of the binder to be used the electrode material mixture. As the water-insoluble grains, use may be made of organic or inorganic grains substantially having no electrical conductivity. These grains show a solubility in water of 100 ppm or less and it is preferred to use those which are insoluble in water.

It is preferable that the protective layer contains these grains in an amount of from 2.5 to 96% by weight, still preferably from 5 to 95% by weight and particularly preferably from 10 to 93% by weight.

Examples of the water-insoluble, electrically conductive grains include metals, metal oxides, metal fibers, carbon fibers and carbon grains such as carbon black or graphite. Among these water-insoluble, electrically conductive grains, it is preferable to use those which are less reactive with alkali metals, in particular, lithium. Metal powders and carbon grains are still preferable therefor. The element constituting the grains preferably has an electric resistance ratio of $5 \times 10^9$ $\Omega \cdot m$ or less at 20° C.

As the metal powder, it is preferable to use one which is less reactive with lithium, i.e., one scarcely forming a lithium alloy. Particular examples thereof include copper, nickel, iron, chromium, molybdenum, titanium, tungsten and tantalum. Such a metal powder may be in the form of needles, columns, plates or mass. The maximum diameter thereof preferably ranges from 0.02 to 20 $\mu$m, still preferably form 0.1 to 10 $\mu$m. It is preferable that the metal powder is not excessively oxidized on the surface thereof. When having been oxidized, it is favorable to thermally treat the metal powder in a reductive atmosphere.

As the carbon grains, use can be made of well-known carbonaceous materials which have been conventionally employed as electrically conductive materials together with non-conductive electrode materials. More particularly speaking, use can be made therefor of conducting agents employed in preparing electrode material mixture.

Examples of water-insoluble grains substantially having no conductivity include a fine powder of Teflon, SiC, aluminum nitride, alumina, zirconia, magnesia, mullite, forsterite and steatite. These grains may be used together with electrically conductive grains. It is preferred that these water-insoluble grains substantially having no conductivity are used in an amount of 0.01 to 10 times as much as the conductive grains.

A positive electrode (negative electrode) sheet can be formed by applying a positive electrode (negative electrode) material mixture onto a current collector followed by drying and compression.

The electrode material mixture can be prepared by mixing a positive electrode-active material (or a negative electrode material) with an electric conducting agent, adding a binder (i.e., a suspension or emulsion of a resin powder) and a dispersion medium thereto, kneading the resultant mixture and then dispersing the same with the use of a stirring mixer or dispersing machine such as a mixer, a homogenizer, a dissolver, a planetary mixer, a paint shaker or a sand mill. As the dispersion medium, use can be made of water or an organic solvent. Water is preferable therefor. It is also possible to further use additives such as a filler, an ionic conducting agent, a pressure increasing agent, etc. In the case of the negative electrode, the dispersion preferably has a pH value of 5 to 10. In the case of the positive electrode, on the other hand, the dispersion preferably has a pH value of 7 to 12.

The application may be performed by various methods, for example, the reverse roll method, the direct roll method, the blade method, the knife method, the extrusion method, the slide method, the curtain method, the gravure method, the bar method, the dip method or the squeeze method. It is particularly preferable to employ the method with the use of an extrusion die or a slide coater. The application is preferably carried out at a speed of 0.1 to 100 m/min. In this step, an appropriate coating method is selected from among those described above depending on the liquid-physical properties and drying characteristics of the electrode material mixture paste so that excellent surface conditions of the coating layer can be established. When the electrode comprises two or more layers, it is preferable, from the viewpoints of forming a uniform battery, production cost, etc., that these layers are coated at the same time. The thickness, length and width of each coating layer are determined depending on the battery size. In a typical case, the thickness of a coating layer having been dried and compressed ranges from 10 to 1000 $\mu$m.

After the completion of the application, the electrode sheet is dried and dehydrated with the use of a hot air stream, vacuum, infrared rays, far infrared rays, electron beams or a low-moisture air. Either one of these procedures or a combination thereof may be employed. It is preferable that the drying is effected at a temperature of from 80 to 350° C., in particular, from 100 to 260° C. The thus dried product preferably contains 2,000 ppm or less, still preferably 500 ppm or less, in moisture content.

The electron sheet can be compressed by the press methods commonly employed in the art. It is preferable to employ the die press method or the calendar press method therefor. The pressing pressure preferably ranges from 10 $kg/cm^2$ to 3 $t/cm^2$, though the present invention is not restricted thereto. In the calendar press method, the pressing is effected preferably at a speed of 0.1 to 50 m/min. The pressing temperature preferably ranges from room temperature to 200° C.

The separator usable in the present invention may be an arbitrary one, so long as it is an insulating film having a large ionic permeability and a definite mechanical strength. It may be made of olefin polymers, fluoropolymers, cellulose polymers, polyimide, nylon, glass fiber or alumina fiber. It may be in the form of a nonwoven fabric, a woven fabric or a microporous film. In particular, it is preferable that the separator is made of polypropylene, polyethylene, a polypropylene/polyethylene mixture, a polypropylene/Teflon mixture or a polyethylene/Teflon mixture and in the form of a microporous film. It is still preferable that the microporous film has a pore size of form 0.01 to 1 $\mu$m and a thickness of from 5 to 50 $\mu$m. The microporous film may be either a single film or a composite film consisting of two or more layers being different from each other in the pore shape, pore density or material. For example, use can be made therefor of a composite film formed by laminating a polyethylene film to a polypropylene film.

To improve the discharge or charge/discharge properties, other compounds may be added to the electrolyte. Examples of these compounds to be added include pyridine, pyrroline, pyrrole, triphenylamine, phenylcarbazole, triethyl phosphite, triethanolamine, cyclic ether, ethylenediamine, n-glyme, hexaphosphoric triamide, nitrobenzene derivatives, sulfur, quinoneimine dyes, N-substituted oxazolidinone and N,N'-substituted imidazolidinone, ethylene glycol dialkyl ethers, quaternary ammonium salts, polyethylene glycol, pyrrole, 2-methoxyethanol, $AlCl_3$ monomers of conductive polymer electrode-active materials, triethylene phosphoramide, trialkylphosphines, morpholine, aryl compounds having carbonyl group, crown ethers such as 12-crown-4 ether, hexamethylphosphoric triamide and 4-alkylmorpholines, dicyclic tertiary amines, oils, quaternary phosphonium salts and tertiary sulfonium salts. Among these, it is particularly preferable to use triphenylamine, phenylcarbazole or a combination thereof.

To make the electrolytic solution incombustible, it is also possible to add a halogenated solvent (i.e., a halogen-containing solvent) (for example, carbon tetrachloride, ethylene chloride trifluoride) thereto. It is also possible to bubble carbon dioxide gas into the electrolytic solution to thereby make it suitable for storage at high temperatures.

It is desirable to minimize the contents of water and free acid components in the electrolytic solution. Therefore, the raw material which is sufficiently dehydrated and purified is preferably used for the electrolytic solution. It is preferable that the electrolytic solution is prepared in a dry air or inert gas atmosphere with a dew point of −30° C. or below. The content of free acid components in the electrolytic solution ranges from 0.1 to 500 ppm, preferably from 0.2 to 100 ppm.

Although the electrolytic solution may be poured at once, it is preferred to pour it in two or more portions. When it is poured in two or more portions, the portions may be either the same or different form each other in composition. (Namely, a nonaqueous solvent or a solution of a lithium salt in the nonaqueous solvent is first poured and then another nonaqueous solvent having a higher viscosity than that of the former one or a solution of a lithium salt dissolved therein is poured.) To shorten the pouring time, the battery can may be evacuated or a centrifugal force or ultrasonic wave may be applied thereto.

As the battery can and the battery top in the present invention, use may be made of nickel-plated iron steel plates, stainless steel plates (SUS304, SUS304L, SUS304N, SUS316, SUS316L, SUS430, SUS444, etc.), nickel-plated stainless steel plates (see above), aluminum or alloys thereof, nickel, titanium and copper which are in the shape of a cylindrical tube, an elliptical tube, a square tube or a rectangular tube. When the outer jacketing (i.e., the sheathing) can also serves as a negative electrode terminal, in particular, it is preferable to use a stainless steel plate or a nickel-plated iron steel plate. When the outer jacketing can also serves as the positive electrode, on the other hand, it is preferable to use a stainless steel plate, aluminum or its alloy. The battery can may be in the shape of a button, a coin, a sheet, a cylinder, a square, etc.

To prevent an increase in the internal pressure of the battery can, a sealing plate may be provided with an explosion-proof valve. It is also possible to cut-out a member such as the battery can or gasket. In addition, use may be made of various safety element having been well-known in the art (for example, over-current inhibitors such as a fuse, a bimetal or a PTC element).

The lead plate to be used in the present invention can be made of electrically conductive metals (for example, iron, nickel, titanium, chromium, molybdenum, copper, aluminum, etc.) or alloys thereof. The battery top, battery can, electrode sheets and lead plate can be welded by using well-known methods (for example, DC or AC electric welding, laser welding, ultrasonic welding). As a sealing agent, use may be made of commonly known compounds or mixtures such as asphalt.

The gasket usable in the present invention may be made of olefin polymers, fluropolymers, cellulose polymers, polyimides or polyamides. From the viewpoint of an excellent resistance to organic solvents and low moisture permeability, it is preferably to use olefin polymers, still preferably those mainly comprising propylene polymer, therefor. It is still preferable to use a propylene/ethylene block copolymer.

It is preferable that the battery thus constructed is subjected to aging. The aging process includes a pretreatment, an activation treatment, a post-treatment, etc. whereby a battery having a large discharge capacity and excellent cycle properties can be obtained. The pretreatment aims at establishing a uniform distribution of lithium within the battery. For example, use may be made of an arbitrary combination of operations selected from controlling of lithium dissolution, controlling temperature for establishing uniform lithium distribution, oscillating and/or rotating, and charge/discharge. The activation treatment aims at intercalating lithium into the negative electrode of the battery. It is preferable to intercalate lithium in an amount of 50 to 120% based on the amount of lithium intercalated in charging the battery in service. The post-treatment, which aims at completing the activation, involves a storage treatment for achieving a uniform battery reaction and a charge/discharge treatment for judgement. These treatments may be arbitrary combined together.

In the present invention, preferable aging conditions before the activation (i.e., pretreatment conditions) are as follows. The temperature preferably ranges from 30 to 70° C., still preferably from 30 to 60° C. and still preferably from 40 to 60° C. The open circuit voltage preferably ranges form 2.5 to 3.8 V, still preferably from 2.5 to 3.5 V and still preferably from 2.8 to 3.3 V. The aging is preferably carried out for 1 to 20 days, still preferably for 1 to 15 days.

The charging voltage at the activation is preferably 4.0 V or above, still preferably from 4.05 to 4.3 V and still preferably from 4.1 to 4.2 V.

Preferable aging conditions after the activation are as follows. The open circuit voltage preferably ranges form 3.9 to 4.3 V, particularly preferably from 4.0 to 4.2 V. The temperature preferably ranges from 30 to 70° C., particularly preferably from 40 to 60° C. The aging is preferably carried out for 0.2 to 20 days, still preferably for 0.5 to 5 days.

If necessary, the battery of the present invention is coated with an outer jacketing material (i.e., a sheathing material). Examples of the outer jacketing material include heat-contracting tubes, adhesive tapes, metal films, papers, fabrics, coatings and plastic cases. It is also possible that the outer jacket (i.e., the sheathing) at least partly has a part undergoing a color change upon heating, thus showing the heat history during service.

If desired, the batteries of the present invention are assembled in a battery pack in a series and/or in parallel. Such a battery pack may be provided with safety elements (for example, a positive temperature coefficient resistor, a temperature fuse, a fuse and/or a current breaker, etc.) as well as a safety circuit (i.e., a circuit monitoring the voltage, temperature, current, etc. of each battery and/or the combined batteries as a whole and being capable of breaking the current if necessary). It is also possible that the battery pack is provided with, as external terminals, the positive electrode and negative electrode terminals of the combined batteries as a whole, the positive electrode and negative electrode terminals of each battery, temperature detection terminals of the combined batteries as the whole and each battery, a current detection terminal of the combined batteries as a whole, etc. The battery pack may assemble a voltage conversion circuit (a DC-DC converter, etc.) therein. The batteries may be fixed by welding the lead plates together. Alternatively, they may be fixed with sockets so as to facilitate removal. Moreover, the battery pack may be provided with a function displaying the residual capacity, charging, number of using, etc.

The batteries according to the present invention are usable in various instruments. In particular, these batteries are preferably employed in video movies, portable videocassette recorders with monitor, movie cameras with monitor, digital cameras, compact cameras, single-lens reflex cameras, films with lens, notebook-type personal computers, notebook-type word processors, electronic pocket notebooks, portable phones, cordless phones, shavers, electric tools, electric mixers, automobiles, etc.

To further illustrate the present invention in greater detail, and not by way of limitation, the following embodiment of the present invention will be given.

(1) A crosslinked polymer which is obtained by a crosslinking reaction between a compound having at least two substituents, in total, of at least one kind selected from the group consisting of $\alpha,\beta$-unsaturated sulfonyl, $\alpha,\beta$-unsaturated nitryl and $\alpha,\beta$-unsaturated carbonyl groups in its molecule and a compound having at least two nucleophilic groups in its molecule.

(2) The crosslinked polymer as described in the above (1) which is obtained by a crosslinking reaction between a compound having at least two $\alpha,\beta$-unsaturated sulfonyl groups in its molecule and a compound having at least two nucleophilic groups in its molecule.

(3) The crosslinked polymer as described in the above (1) which is obtained by a crosslinking reaction between a compound having at least two $\alpha,\beta$-unsaturated nitryl groups in its molecule and a compound having at least two nucleophilic groups in its molecule.

(4) The crosslinked polymer as described in the above (1) which is obtained by a crosslinking reaction between a compound having at least one $\alpha,\beta$-unsaturated sulfonyl group and at least one $\alpha,\beta$-unsaturated nitryl groups in its molecule and a compound having at least two nucleophilic groups in its molecule.

(5) The crosslinked polymer as described in the above (1) wherein said compound having nucleophilic groups has a polyether bond.

(6) The crosslinked polymer as described in the above (1) wherein said nucleophilic groups are mercapto, sulfido, sulfino or sulfinato groups.

(7) The crosslinked polymer as described in the above (2) wherein said nucleophilic groups are mercapto, sulfido, sulfino or sulfinato groups.

(8) The crosslinked polymer as described in the above (3) wherein said nucleophilic groups are mercapto, sulfido, sulfino or sulfinato groups.

(9) The crosslinked polymer as described in the above (4) wherein said nucleophilic groups are mercapto, sulfido, sulfino or sulfinato groups.

(10) The crosslinked polymer as described in the above (1) wherein said nucleophilic groups are amino groups.

(11) The crosslinked polymer as described in the above (2) wherein said nucleophilic groups are amino groups.

(12) The crosslinked polymer as described in the above (3) wherein said nucleophilic groups are amino groups.

(13) The crosslinked polymer as described in the above (4) wherein said nucleophilic groups are amino groups.

(14) The crosslinked polymer as described in the above (1) which is obtained by a crosslinking reaction between a compound having at least two $\alpha,\beta$-unsaturated carbonyl groups in its molecule and a compound having at least two nucleophilic groups in its molecule.

(15) The crosslinked polymer as described in the above (14) wherein said nucleophilic groups are mercapto, sulfido, sulfino or sulfinato groups.

(16) The crosslinked polymer as described in the above (14) wherein said nucleophilic groups are amino groups.

(17) The crosslinked polymer as described in the above (1) which is obtained by a crosslinking reaction between a compound having at least one substituent selected from the group consisting of α,β-unsaturated sulfonyl and α,β-unsaturated nitryl groups and at least one α,β-unsaturated carbonyl group in its molecule and a compound having at least two nucleophilic groups in its molecule.

(18) An electrolyte containing the crosslinked polymer as described in the above (1) and a salt.

(19) An electrolyte containing the crosslinked polymer as described in the above (2) and a salt.

(20) An electrolyte containing the crosslinked polymer as described in the above (3) and a salt.

(21) An electrolyte containing the crosslinked polymer as described in the above (4) and a salt.

(22) An electrolyte containing the crosslinked polymer as described in the above (5) and a salt.

(23) An electrolyte containing the crosslinked polymer as described in the above (6) and a salt.

(24) An electrolyte containing the crosslinked polymer as described in the above (7) and a salt.

(25) An electrolyte containing the crosslinked polymer as described in the above (8) and a salt.

(26) An electrolyte containing the crosslinked polymer as described in the above (9) and a salt.

(27) An electrolyte containing the crosslinked polymer as described in the above (10) and a salt.

(28) An electrolyte containing the crosslinked polymer as described in the above (11) and a salt.

(29) An electrolyte containing the crosslinked polymer as described in the above (12) and a salt.

(30) An electrolyte containing the crosslinked polymer as described in the above (13) and a salt.

(31) An electrolyte containing the crosslinked polymer as described in the above (14) and a salt.

(32) An electrolyte containing the crosslinked polymer as described in the above (15) and a salt.

(33) An electrolyte containing the crosslinked polymer as described in the above (16) and a salt.

(34) An electrolyte containing the crosslinked polymer as described in the above (17) and a salt.

(35) An electrolyte containing a crosslinked polymer, which is obtained by a crosslinking reaction between a compound having at least two substituents, in total, of at least one kind selected from the group consisting of α,β-unsaturated sulfonyl, α,β-unsaturated nitryl and α,β-unsaturated carbonyl groups in its molecule and a compound having at least two nucleophilic groups in its molecule, a salt and an organic solvent.

(36) The electrolyte as described in the above (35) wherein said organic solvent is a carbonic acid ester.

(37) The electrolyte as described in the above (35) wherein said organic solvent is an organic nitrile.

(38) The electrolyte as described in the above (35) wherein said nucleophilic groups are mercapto, sulfido, sulfino or sulfinato groups.

(39) The electrolyte as described in the above (35) wherein said nucleophilic groups are amino groups.

(40) A process for producing an electrolyte comprising reacting a compound having at least two substituents, in total, of at least one kind selected from the group consisting of α,β-unsaturated sulfonyl, α,β-unsaturated nitryl and α,β-unsaturated carbonyl groups in its molecule with a compound having at least two nucleophilic groups in its molecule in a salt or an organic solvent in which a salt is dissolved.

(41) The production process as described in the above (40) wherein said nucleophilic groups are amino groups.

(42) A nonaqueous secondary battery having a positive electrode, a negative electrode and an electrolyte, wherein said electrolyte is one comprising a crosslinked polymer, which is obtained by a crosslinking reaction between a compound having at least two substituents, in total, of at least one kind selected from the group consisting of α,β-unsaturated sulfonyl, α,β-unsaturated nitryl and α,β-unsaturated carbonyl groups in its molecule and a compound having at least two nucleophilic groups in its molecule, a salt and an organic solvent.

(43) The nonaqueous secondary battery as described in the above (42) wherein said polymer is one obtained by a crosslinking reaction between a compound having at least two substituents selected from the group consisting of α,β-unsaturated sulfonyl and α,β-unsaturated nitryl groups in its molecule and a compound having at least two nucleophilic groups selected from the group consisting of amino, mercapto, sulfido, sulfino or sulfinato groups in its molecule.

(44) The nonaqueous secondary battery as described in the above (42) wherein said polymer is one obtained by a crosslinking reaction between a compound having at least two α,β-unsaturated carbonyl groups in its molecule and a compound having at least two nucleophilic groups selected from the group consisting of amino, mercapto, sulfido, sulfino or sulfinato groups in its molecule.

(45) The nonaqueous secondary battery as described in any of the above (42) to (44) wherein said solvent is a carbonic acid ester or an organic nitrile solvent.

(46) The nonaqueous secondary battery as described in any of the above (42) to (45) wherein said salt contains at least one compound selected from the group consisting of $LiCF_3SO_3$, $LiPF_6$, $LiClO_4$, $LiI$, $LiBF_4$, $LiCF_3CO_2$, $LiSCN$, $LiN(SO_2CF_3)_2$, $NaI$ and $NaBr$.

(47) The nonaqueous secondary battery as described in any of the above (42) to (46) which is a sheet or plate type battery.

EXAMPLE

To further illustrate the present invention in greater detail, the following Examples will be given. However, it is to be understood that the present invention is not restricted thereto but various changes may be resorted to without departing from the spirit of the invention.

Example I-1

Preparation of polymer electrolyte 1.2 g of $LiPF_6$ was dissolved in 6 ml of a ethylene carbonate/propylene carbonate mixture (volume ratio=1/1). To the obtained solution 1.5 g of the compound 1–6 was added as the compound (A) and dissolved therein. Further, 0.53 g of the compound 3—3 was added thereto as the compound (B) at room temperature (25° C.) followed by stirring. Next, the resulting mixture was quickly casted onto a Teflon plate and allowed to stand for 2 hours to thereby give a salt-containing crosslinked polymer film F-1. Moreover, films F-2 to F-11 were obtained in the same manner as in film F-1 except for using the compounds (A) and (B), the salt and the organic solvents as listed in the following Table 1.

The impedance of each of the thus obtained films was measured at 25° C. at $10^5$ to 0.1 Hz and the ionic conductivity thereof was determined by Cole-Cole's plot. The results are shown below.

TABLE I-1

| Sample No. | Compound (A) (amount) | Compound (B) (amount) | Organic solvent (amount) | Salt (amount) | Ionic conductivity (S/cm) |
|---|---|---|---|---|---|
| F-1 | 1-6 (1.5 g) | 3-3 (0.53 g) | EC/PC = 1/1 (by vol.)(6 ml) | $LiPF_6$ (1.2 g) | $1.0 \times 10^{-3}$ |
| F-2 | 1-6 (1.5 g) | 3-3 (0.53 g) | do. | $LiCF_3SO_3$ (1.2g) | $1.0 \times 10^{-3}$ |
| F-3 | 1-6 (1.5 g) | 3-6 (1.47 g) | acetonitrile (6 ml) | $LiPF_6$ (1.2 g) | $1.1 \times 10^{-3}$ |
| F-4 | 1-9 (1.5 g) | 3-3 (1.1 g) | EC/PC = 1/1 (by vol.)(6 ml) | do. | $0.9 \times 10^{-3}$ |
| F-5 | 1-12 (1.5 g) | 3-4 (1.0 g) | do. | do. | $1.0 \times 10^{-3}$ |
| F-6 | 2-5 (1.0 g) | 3-3 (0.53 g) | do. | do. | $1.2 \times 10^{-3}$ |
| F-7 | 2-9 (1.0 g) | 3-3 (1.1 g) | do. | do. | $1.0 \times 10^{-3}$ |
| F-8 | 2-9 (1.0 g) | 3-3 (1.1 g) | dimethyl carbonate/EC = 8/2 (by vol.) (6 ml) | do. | $0.9 \times 10^{-3}$ |
| F-9 | 2-11 (1.0 g) | 3-4 (1.6 g) | do. | do. | $0.8 \times 10^{-3}$ |
| F-10 | 2-11 (1.0 g) | 3-12 (1.2 g) | EC/PC = 1/1 (by vol.)(6 ml) | do. | $1.0 \times 10^{-3}$ |
| F-11 | 2-11 (1.0 g) | 3-15 (1.2 g) | do. | do. | $1.1 \times 10^{-3}$ |
| F-12* | ethylene glycol diacrylate | trifunctional polyether | — | $LiCF_3SO_3$ | $1 \times 10^{-4}$ |

*Compound disclosed in Example in JP-A-63-76273.

As is apparent from the results of Table I-1, the electrolytes obtained by using the crosslinked polymers according to the present invention show high ionic conductivities. Moreover, The electrolytes of the present invention can be produced under mild conditions without any strong base.

Use of the crosslinked polymers of the present invention makes it possible to easily obtain electrolytes which are excellent in ionic conductivity.

Example II-1

Preparation of electrolytic gel film 1.2 g of $LiPF_6$ was dissolved in 6 ml of a ethylene carbonate (EC)/propylene carbonate (PC) mixture (volume ratio =1/1). To the obtained solution 1.5 g of the compound 1–6 was added as the compound (A) and dissolved therein. Further, 0.53 g of the compound 3—3 was added thereto as the compound (B) at room temperature (25° C.) followed by stirring. Next, the resulting mixture was quickly cast onto a Teflon plate and allowed to stand for 2 hours to thereby give an electrolytic gel film F-1. Moreover, electrolytic gel films F-2 to F-11 were obtained in the same manner as in electrolytic gel film F-1, except for using the compounds (A) and (B), the salt and the organic solvents as listed in the following Table II-1.

For comparison, an electrolytic gel film F-12 was obtained in the same manner as in electrolytic gel film F-1, except for using ethylene glycol diacrylate as the compound (A) and a trifunctional polyether as the compound (B), adding a small amount of potassium methoxide and allowing to stand, after mixing, at 40° C.

(Formation of positive electrode sheet)

43 parts by weight of $LiCoO_2$ employed as a positive electrode material, 2 parts by weight of scale graphite, 2 parts by weight of acetylene black and 3 parts by weight of polyacrylonitrile employed as a binder were kneaded in 100 parts by weight of N-methyl-2-pyrrolidone employed as a medium. The obtained slurry was applied onto an aluminum foil of 20 μm in thickness by using an extrusion coater followed by drying and compression molding with the use of a calendar press machine. Next, a lead plate made of aluminum was welded to one end of the molded article to give a positive electrode sheet of 95 μm in thickness, 54 mm in width and 49 mm in length. Then it was heated to 230° C. in a dry air atmosphere with a dew point of -40° C. or below for 1 hour with the use of a far infrared heater.

(Formation of negative electrode sheet)

43 parts by weight of a mesophase pitch carbonaceous material (manufactured by PETOCA LTD.) employed as a negative electrode material, a mixture of 2 parts by weight of acetylene black with 2 parts by weight of graphite employed as a conducting agent, and 3 parts by weight of polyacrylonitrile employed as a binder were kneaded in 100 parts by weight of N-methylpyrrolidone employed as a medium. The obtained negative electrode composition in the form of a slurry was applied onto a copper foil of 10 μm in thickness by using an extrusion coater followed by drying and compression molding with the use of a calendar press machine to give a negative electrode sheet of 46 μm in thickness, 55 mm in width and 50 mm in length. Next, a lead plate made of nickel was welded to one end of the negative electrode sheet followed by heating at 230° C. in a dry air atmosphere with a dew point of –40° C. or below for 1 hour with the use of a far infrared heater.

(Formation of sheet-type secondary battery)

The positive electrode and the negative electrode were each dried and dehydrated at 230° C. in a dry air atmosphere with a dew point of –40° C. or below for 30 minutes. In the dry atmosphere, the thus dried and dehydrated positive electrode sheet (11) of 54 mm in width and 49 mm in length, the electrolytic gel film (12) cut into 60 mm in width and 60 mm in length, and the dried and dehydrated negative electrode sheet (13) of 55 mm in width and 50 mm in length were laminated in this order . By using an outer jacketing material made of a laminate film of polyethylene (50 μm)/ polyethylene terephthalate (50 μm), the four edges were sealed by thermally fusing to give a sheet type secondary battery as shown in FIG. 1.

The sheet type battery thus formed was charged at 25° C. at 60 mA. In this case, charge was performed with the use of a constant current up to 4.2 V and then the current was controlled so that the voltage was maintained at the constant level of 4.2 V for 2.5 hours after the initiation of the charging. Discharge was carried out at 25° C. and –10° C. at 60 mA with a constant current up to 3.0 V. The discharge capacity ratio of –10° C./25° C. was referred to as the low temperature characteristics. Table II-1 summarizes the data of each sheet type battery.

TABLE II-1

| Sample No. | Compound (A) (amount) | Compound (B) (amount) | Solvent (amount) | Supporting salt (amount) | Low temperature characteristics | |
|---|---|---|---|---|---|---|
| F-1 | 1-6 (1.5 g) | 3-3 (0.53 g) | EC/PC = 1/1 (6 ml) | LiPF$_6$ (1.2 g) | 85% | invention |
| F-2 | 1-6 (1.5 g) | 3-3 (0.53 g) | EC/PC = 1/1 (6 ml) | LiCF$_3$SO$_3$ (1.2 g) | 86% | do. |
| F-3 | 1-6 (1.5 g) | 3-6 (1.47 g) | acetonitrile (6 ml) | LiPF$_6$ (1.2 g) | 88% | do. |
| F-4 | 1-9 (1.5 g) | 3-3 (1.10 g) | EC/PC = 1/1 (6 ml) | do. | 83% | do. |
| F-5 | 1-12 (1.5 g) | 3-4 (1.00 g) | do. | do. | 85% | do. |
| F-6 | 2-5 (1.0 g) | 3-3 (0.53 g) | do. | do. | 88% | do. |
| F-7 | 2-9 (1.0 g) | 3-3 (1.10 g) | do. | do. | 84% | do. |
| F-8 | 2-9 (1.0 g) | 3-3 (1.10 g) | DMC/EC = 8/2 (6 ml) | do. | 85% | do. |
| F-9 | 2-11 (1.0 g) | 3-4 (1.60 g) | do. | do. | 86% | do. |
| F-10 | 2-11 (1.0 g) | 3-12 (1.20 g) | EC/PC = 1/1 (6 ml) | do. | 87% | do. |
| F-11 | 2-11 (1.0 g) | 3-15 (1.20 g) | do. | do. | 85% | do. |
| F-12 | ethylene glycol diacrylate | trifunctional polyether | do. | do. | 78% | comparison |
| F-13 | do. | do. | — | LiCF$_3$SO$_3$ (1.2 g) | 62% | do. |

EC: Ethylene carbonate.
PC: Propylene carbonate.
DMC: Dimethyl carbonate.

As is apparent from the results of Table II-1, the sheet type batteries having the electrolytes obtained by using the crosslinked polymers according to the present invention show excellent low temperature characteristics. Moreover, the electrolytes of the present invention can be produced under mild conditions without any strong base. It is also clarified that the batteries with the use of these electrolytes scarcely suffer from liquid leakage.

Use of the crosslinked polymers of the present invention makes it possible to easily obtain electrolytes which are excellent in ionic conductivity and nonaqueous secondary batteries which are excellent in low temperature characteristics.

While the invention has been described in detail and with reference to specific embodiments thereof, it will be apparent to one skilled in the art that various changes and modifications can be made therein without departing from the spirit and scope thereof.

What is claimed is:

1. A crosslinked polymer which is obtained by a crosslinking reaction comprising a Michael reaction between a compound having at least two substituents, in total, of at least one kind selected from the group consisting of α,β-unsaturated sulfonyl and α, β-unsaturated nitryl groups in its molecule and a compound having at least two nucleophilic groups in its molecule.

2. The crosslinked polymer as claimed in claim 1 wherein said nucleophilic groups are amino, mercapto, sulfido, sulfino or sulfinato groups.

3. An electrolyte containing a crosslinked polymer, which is obtained by a crosslinking reaction comprising a Michael reaction between a compound having at least tow substituents of at least one kind selected from the group consisting of α,β-unsaturated sulfonyl and α,β-unsaturated nitryl groups in its molecule and a compound having at least two nucleophilic groups in its molecule, and a salt.

4. The electrolyte as claimed in claim 3 which further contains an organic solvent.

5. The electrolyte as claimed in claim 3 wherein said nucleophilic groups are amino, mercapto, sulfido, sulfino or sulfinato groups.

6. A process for producing an electrolyte comprising reacting a compound having at least two substituents of at least one kind selected from the group consisting of a α,β-unsaturated sulfonyl and α,β-unsaturated nitryl groups in its molecule with a compound having at least two nucleophilic groups in its molecule in a salt or an organic solvent in which the salt is dissolved, and wherein the process comprises a Michael reaction.

7. The process for producing an electrolyte as claimed in claim 6 wherein said nucleophilic groups are amino, mercapto, sulfido, sulfino or sulfinato groups.

8. A nonaqueous secondary battery having a positive electrode, a negative electrode and an electrolyte, wherein said electrolyte is one comprising a crosslinked polymer, which is obtained by a crosslinking reaction comprising a Michael reaction between a compound having at least two substituents of at least one kind selected from the group consisting of α, β-unsaturated sulfonyl and α,β-unsaturated nitryl groups in its molecule and a compound having at least two nucleophilic groups in its molecule, a salt and an organic solvent.

9. The nonaqueous secondary battery as claimed in claim 8 wherein said polymer is one obtained by a crosslinking reaction including a compound having at least two nucleophilic groups selected from the group consisting of amino, mercapto, sulfido, sulfino or sulfinato groups in its molecule.

10. A non-aqueous secondary battery having a positive electrode, a negative electrode and an electrolyte, wherein said electrolyte is one comprising a crosslinked polymer, which is obtained by a crosslinking reaction between a compound having at least two substituents of at least one kind selected from the group consisting of α,β-unsaturated sulfonyl and α.β-unsaturated nitryl groups in its molecule and a compound having at least two nucleophilic groups in its molecule, a salt and an organic solvent;

wherein the nonaqueous secondary battery is obtained by a crosslinking reaction between a compound having at least two substituents selected from the group consisting of α,β-unsaturated sulfonyl and α,β-unsaturated nitryl groups in its molecule and a compound having at least two nucleophilic groups selected from the group consisting of amino, mercapto, sulfido, sulfino or sulfinato groups in its molecule.

* * * * *